W. J. LOUDENSLAGER.
BREAD RAISING CABINET.
APPLICATION FILED SEPT. 28, 1909.
966,341.
Patented Aug. 2, 1910.
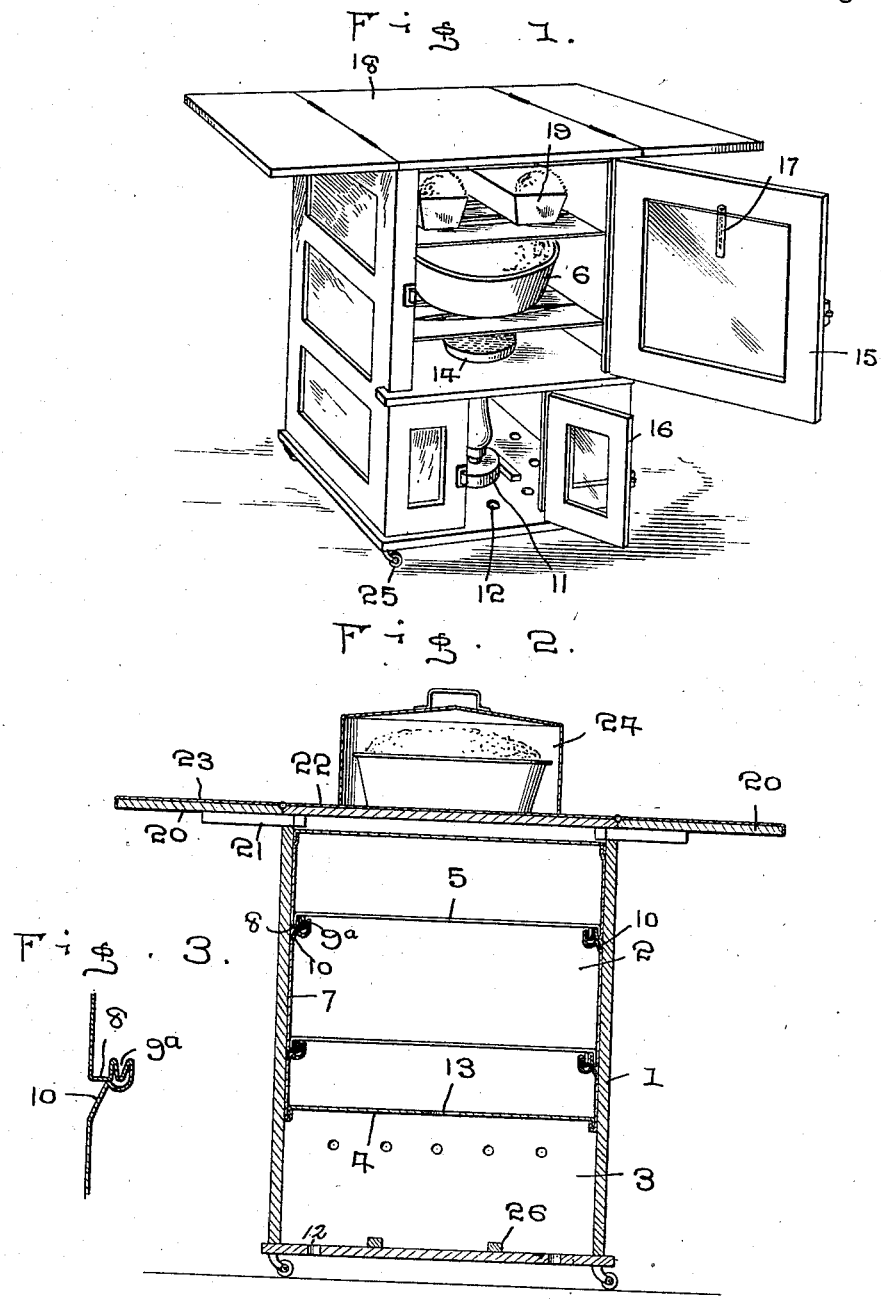
WITNESSES:
INVENTOR
Wm J. Loudenslager
BY
W. J. Fitzgerald & Co.
Attorneys

UNITED STATES PATENT OFFICE.

WILLIAM J. LOUDENSLAGER, OF JACKSONBURG, WEST VIRGINIA, ASSIGNOR TO DAVID CARMICHAEL AND WILLIAM CARLIN, OF SMITHFIELD, WEST VIRGINIA.

BREAD-RAISING CABINET.

966,341.

Specification of Letters Patent. Patented Aug. 2, 1910.

Application filed September 28, 1909. Serial No. 519,922.

*To all whom it may concern:*

Be it known that I, WILLIAM J. LOUDENSLAGER, a citizen of the United States, residing at Jacksonburg, in the county of Wetzel and State of West Virginia, have invented certain new and useful Improvements in Bread-Raising Cabinets; and I do hereby declare the following to be a full, clear, and exact description of the invention, such as will enable others skilled in the art to which it appertains to make and use the same.

My invention relates to new and useful improvements in bread raising cabinets for causing the dough to raise after the same has been mixed.

A further object is to provide means for heating the cabinet.

A further object is to provide means for providing moisture in the cabinet.

A still further object is to provide suitable supports for the articles containing the dough and retain said supports in position in the cabinet and a still further object is to provide a suitable mixing or kneading table at the upper end of the cabinet.

Other objects and advantages will be hereinafter referred to and more particularly pointed out in the claims.

In the accompanying drawings forming part of this application, Figure 1 is a perspective view of the cabinet complete, and applied to use. Fig. 2 is a vertical sectional view through the cabinet showing a means for raising the dough without placing the same in the cabinet and, Fig. 3 is an enlarged detail sectional view through the lining of the cabinet showing the means of supporting the shelves or partitions.

Referring to the drawings in which similar reference numerals designate corresponding parts throughout the several views, 1 indicates the body of the cabinet, the interior of which is divided into an upper and lower compartment 2 and 3, respectively, by means of a partition 4, while the upper compartment 2 is provided with a number of shelves 5, which shelves are preferably perforated and adapted to receive the utensils 6 in which the bread dough is placed. The shelves 5 are held in position in the compartment 2 by placing a lining 7 within the cabinet and bending out portions thereof to form ledges 8 with which the ends of the shelves 5 engage.

As shown in Fig. 2, the ends of the shelves are provided with channels 9, which are adapted to fit over the upwardly extending edges of the ledges 8, the folded portion of the lining forming said ledges being pressed together, while in Fig. 3, I have shown more in detail the parts of the lining forming the ledges which consist of portions extended outwardly and crimped or folded one or more times, thereby providing a notch 9ª, into which the ends of the shelves are adapted to rest, that portion of the lining below each ledge being extended at an angle to form a brace portion 10.

To successfully operate the cabinet, a lamp or other heating medium 11 is placed in the lower compartment 3, the floor of the body having openings 12 therein to admit air into the lower compartment and thus producing the proper combustion, the lamp being preferably positioned below a port 13 in the partition 4, while immediately over said port 13 is placed a pan or similar article 14, which contains water, thus providing a vapor within the upper portion of the cabinet.

Access is gained to the upper and lower compartments through the medium of doors 15 and 16, respectively, said doors being hinged to the cabinet in the usual or any preferred manner and provided with suitable catches for retaining the doors in their closed positions and to the inner face of the door 15 is attached a thermometer 17, whereby the temperature of the upper compartment 2 may be ascertained at any time.

In treating the dough, the products composing the same are thoroughly mixed and the utensil containing the mixture placed upon one of the shelves 5 immediately above the partition 4, when the lamp is lighted and placed below the port 13, the heat from said lamp raising the temperature within the compartments and also serving to heat the water in the pan 14, thus providing a suitable moisture within the cabinet. As soon as the dough has been properly raised, it is removed from the compartment 2 and placed upon the table 18 formed at the upper end of the cabinet, where it is properly kneaded and placed in suitable bake pans 19, said pans being again placed within the cabinet and treated as before.

In order to increase the size of the table 18, a leaf 20 is hingedly secured at each end of the table said leaves being half the width of the table, so that when folded together, the top of the cabinet will be of normal size, but when said leaves are extended as shown in the drawings, the size or capacity of the table will be accordingly increased and the leaves are supported in their outward position by sliding arms 21, which are adapted to be moved into the upper portion of the cabinet when not in use and thereby removed from sight.

If preferred, the top of the table and the corresponding faces of the leaves 20 may be covered with strips of metal 22 and 23, respectively, said strips being preferably composed of zinc or like substance, thereby providing a surface upon which to knead the dough.

Instead of placing the utensil containing the dough mixture within the cabinet, it may be treated more slowly by positioning the utensil on the table 18 and extending a cover 24 over the utensil and its contents and thus removing the dough from direct contact with the heat in the cabinet, in which event the raising action of the dough will be less rapid than when placed within the cabinet.

The cabinet is preferably mounted upon casters 25, so that the same may be moved to any desired position or place and the lamp is held in position by means of cleats 26, which are attached to the floor of the lower compartment 3.

While I have shown and described the cabinet as being employed for raising bread dough, it will be readily understood that the cabinet can be used for various purposes, such as retaining food stuffs in a heated or warm state, and the cabinet can also be used for raising other articles of food stuff mixtures, as well as bread dough.

What I claim is:

1. A cabinet of the class described, comprising a body having a partition therein dividing the interior of said body into an upper and lower compartment, said partition having a port therethrough, a heating means adapted to be arranged in said lower compartment and below said port, a water containing means arranged above said port, a plurality of shelves arranged in said upper compartment, a lining applied to the inner surface of said upper compartment, formed with upwardly extending ledges, the parts of the lining forming said ledges being extended upwardly and crimped one or more times to form notches, the portion of the lining below each edge being extended at an angle to form a brace for the ledge, said shelves having downwardly extending ends adapted to engage said notches, and a table at the upper end of said body.

2. A cabinet of the class described, comprising a body formed with compartments therein, a lining applied to the inner surface of said body, said lining being formed with upwardly extending ledges, the parts of the lining forming said ledges being extended upwardly and crimped one or more times to form notches, the portion of the lining below each ledge being extended at an angle to form a brace for the ledge, and shelves having downwardly extending ends adapted to engage said notches.

In testimony whereof I have signed my name to this specification in the presence of two subscribing witnesses.

WILLIAM J. LOUDENSLAGER.

Witnesses:
H. R. JOHNSTON,
D. M. JOHNSTON.